United States Patent

[11] 3,595,065

| [72] | Inventor | Harry E. Scribner<br>18600 Glenwood Lane, Brookfield, Wis. 53005 |
|---|---|---|
| [21] | Appl. No. | 858,576 |
| [22] | Filed | Sept. 17, 1969 |
| [45] | Patented | July 27, 1971 |

[54] DIFFERENTIAL PRESSURE CROWN INSPECTOR
10 Claims, 4 Drawing Figs.

[52] U.S. Cl. ............................................. 73/37, 73/45.1
[51] Int. Cl. .......................................... G01m 3/02
[50] Field of Search ........................... 73/37, 37.5, 45.2, 49.2, 45.3, 45, 45.1

[56] References Cited
UNITED STATES PATENTS

| 2,432,871 | 12/1947 | Fedorchak et al. | 73/45.3 |
|---|---|---|---|
| 2,606,657 | 8/1952 | Berthelsen | 73/45.1 X |
| 3,091,958 | 6/1963 | Robins | 73/45.2 |
| 3,135,575 | 6/1964 | Breidenbach et al. | 73/45.1 X |
| 3,390,569 | 7/1968 | McMeekin | 73/37 |
| 3,426,582 | 2/1969 | McArthur et al. | 73/45.1 |
| 3,496,761 | 2/1970 | Powers, Jr. | 73/45.2 |

Primary Examiner—Louis R. Prince
Assistant Examiner—William A. Henry, II
Attorney—Polachek & Saulsbury ABSTRACT: This apparatus inspects the top of bottles, containers or other articles as they move along on a conveyor past an inspection position. Resilient sensor heads are carried on rotating star wheels which engage each container in turn. One sensor head engages the top of a bottom or container and fluid under pressure or vacuum is applied to the head. If the top of the bottle container is defective, fluid leaks thereover and an ejection device is operated that automatically ejects the defective bottle or container.

INVENTOR.
Harry E. Scribner
BY
Polachek & Saulsbury
ATTORNEYS

INVENTOR.
Harry E. Scribner
BY
Polachek & Saulsbury
ATTORNEYS

DIFFERENTIAL PRESSURE CROWN INSPECTOR

This invention relates to apparatus adapted to inspect the crown ring, lip or top of a bottle or other container for defects such as cracks, chips, flaws, malformations, irregularities, and so on.

Heretofore, it has been necessary to inspect bottles or containers visually for defects. Machines provided with means for inspecting containers mechanically have been complex and lacking in reliability since they failed to detect small flaws which would render containers defective.

According to the present invention, bottles or containers moving along on a conveyor are inspected automatically and ejected if found defective. Inspection is accomplished by monitoring fluid pressure or vacuum applied to the top of a bottle or container through a tight fitting rubber or plastic sensing head. The fluid can be any suitable gas or liquid. The sensing head is made of resilient material and is formed with a recess to receive the full top edge of the bottle or container. The recess constitutes a pressure chamber into which fluid under pressure or vacuum is applied against both sides of the crown ring of a bottle or container. The crown ring is utilized as a wall of the pressure chamber. If the top of the bottle or container is defective, fluid will leak out to atmosphere or into the bottle and the applied pressure will drop. The drop in pressure can be used to activate a container rejection device. If vacuum is used, less vacuum will be drawn.

In a preferred form of the invention, a pair of star wheels are rotatably mounted to engage a series of bottles carried in a line on a moving conveyor past the inspection apparatus and pulling the star wheels about. A plurality of sensor heads are carried by arms which rotate with the star wheels. Fluid or vacuum conveying tubes lead from a manifold to the several sensor heads. Fluid under pressure or vacuum is supplied to a fitting or union which delivers fluid or vacuum via the manifold to one particular sensor head located in inspection position. If the fluid pressure or vacuum applied to the top of the container drops or is lessened beyond a predetermined limit a container ejection device is actuated to remove container from the moving belt. At the same time an alarm can be actuated to signal the detection of a defective container and/or a counter can be operated to register the ejection of the container.

It is therefore a principal object of the invention to provide apparatus for inspecting the top of a container such as a bottle, jar, flask and the like.

Another object is to provide apparatus for automatically and mechanically inspecting one container at a time in a series of containers moving along on a belt.

A further object is to provide differential fluid pressure means including a pliable sensing head to inspect the top of a container.

Another object is to provide means for inspecting, detecting and rejecting a container automatically when it is found to have a defective top.

Other and further objects and advantages of the invention will become apparent from the following detailed description taken together with the drawings wherein.

Figure 1:
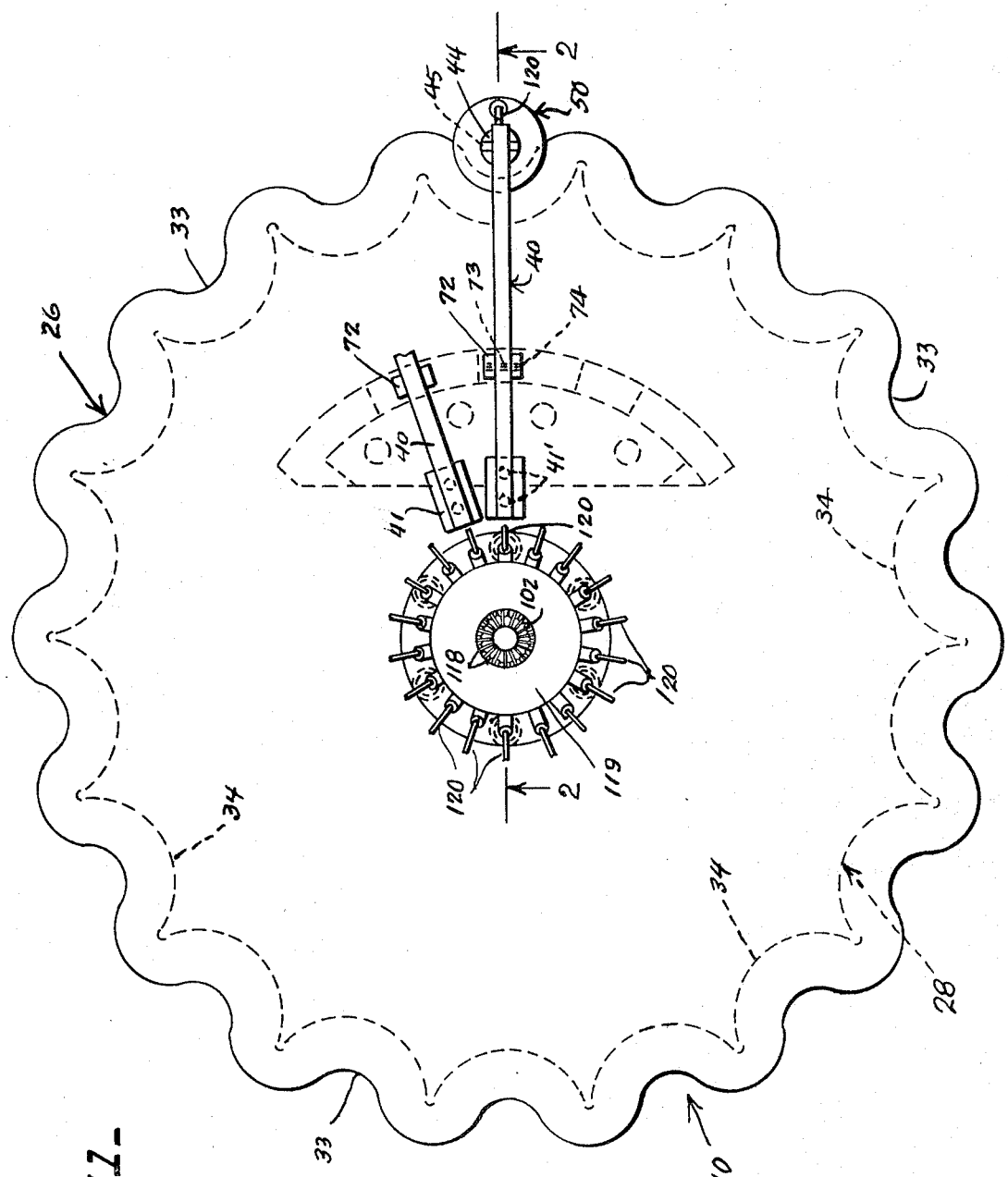
FIG. 1 is a top plan view of inspection apparatus embodying the invention, parts being omitted or broken away.

Referring to the drawing, there is shown apparatus 10 including stationary table or platform 12 on which is secured by bolts 14 a flange bracket 15 having an upright axially vertical post 16 secured to the bracket by a setscrew 17. The post 16 carries upper and lower ball bearing assemblies 18, 20. A hollow cylindrical shaft 22 surrounds post 16 and is rotatably carried by outer races 24 of the ball bearings assemblies 18 and 20. Upper and lower horizontal star wheels 26, 28 are carried by upper and lower flanges 29, 30, respectively secured to hollow shaft 22 by bolts 31, 32. Each wheel has a fluted or serrated periphery as best seen in FIG. 1 with indentations 33, 34. The indentations 33 in the upper wheel are smaller than indentations 34 in the lower wheel and are located further radially outward of the axis of the hollow shaft 22. Indentations 33 receive the necks 35 of bottles 36, one of which is indicated by dotted lines in FIG. 2. The bottles are carried on a moving conveyor 38 horizontally in line past the star wheels 26, 28 along lateral guide rail 39.

Mounted on the upper wheel 26 is a plurality of vertical posts 41 secured thereto by bolts 41' and to the upper ends of which horizontal arms 40 are pivotally connected by pins 42. These arms 40 extend radially outward of the axis of hollow shaft 22. The outer ends of the arms carry stationary brackets 44 fixedly secured thereto by pins 45. Each bracket 44 supports one sensor head 50. Each sensor head 50 is made of resilient material such as natural or artificial rubber. A recess or groove 54 of any configuration is formed in the bottom of each head adapted to receive the top of the bottle or any other article being inspected. The recess is located radially inward of outer wall 55 defining a flexible lower lip 56. Concentric lip 58 is defined between recess 54 and a central bore 60. A head 59 of a bolt 62 is seated in the bore 60 and engages threaded cylindrical nut 64 depending from bracket 44 and extending through central passage 66 in the sensor head 50. The flexible lips 56 and 58 can engage on opposite sides of the crown ring 68 at the top end of a bottle 36 to contain the same.

One sensor head 50 at a time is engaged on the top end of an open bottle which arrives at the inspection position defined by that one arm 40 which is perpendicular to the travel of conveyor 38. Each head arm 40 can be elevated by a vertically movable rod 70 pivotally engaged at its upper end with a bracket 72 which is pivotally supported by a pin 73 between ends of the arm. Pin 74 pivotally engages rod 70 near the top of the rod which is axially vertically slidable in a sleeve 75 in the upper wheel 26. Engaged on the lower portion of the rod is a sleeve 76 on star wheel 28 and adjustably positioned and supported therein by nuts 78. A coil spring 80 surrounds the rod 70 and bears at its lower end on the upper end of sleeve 76. The upper end of the spring 80 reacts against an annular plate or washer 82 at the underside of star wheel 26. A ring 83 on the rod 70 above wheel 26 limits downward movement of the rod 70. At the lower end of the rod which extends below the wheel 28 is an end bearing 84 serving as a cam follower which rides on an arcuate cam 86 mounted on table 12 and secured thereto by bolts 87. Sleeve 76 along with rod 70 slides axially in a hole 88 in wheel 28.

Fluid under pressure is supplied to that one head 50 which is located at the inspection position. A tube 90 extending from a suitable source of fluid under pressure is connected to a union 100. The union 100 has a central stationary cylindrical valve core 102 secured by a threaded, flanged, coupling ring 104 engaged with threaded nipple 106 on top of post 16; see FIG. 3. The core 102 has a closed end 108 and an annular flange 110 of the valve core is engaged under coupling ring 104. A manifold tube 112 surrounds the core 102, and is rotatable on the core 102 and its upper end is rotatably engaged in a groove 114 in the union 100. In the manifold tube 112 is a multiplicity of holes 116 in which are engaged narrow ends 118 of tubes 120. Each tube 120 terminates at a hole 122 extending vertically of sensor head 50 and opening into recess 54; see FIG. 2. Core 102 has a single radial hole 125 opening into that one tube 120 which terminates at the head 50 at inspection position. Cylindrical hub 119 on wheel 26 supports the inner ends 118 of tubes 120 to rotate them therewith.

Figure 2:
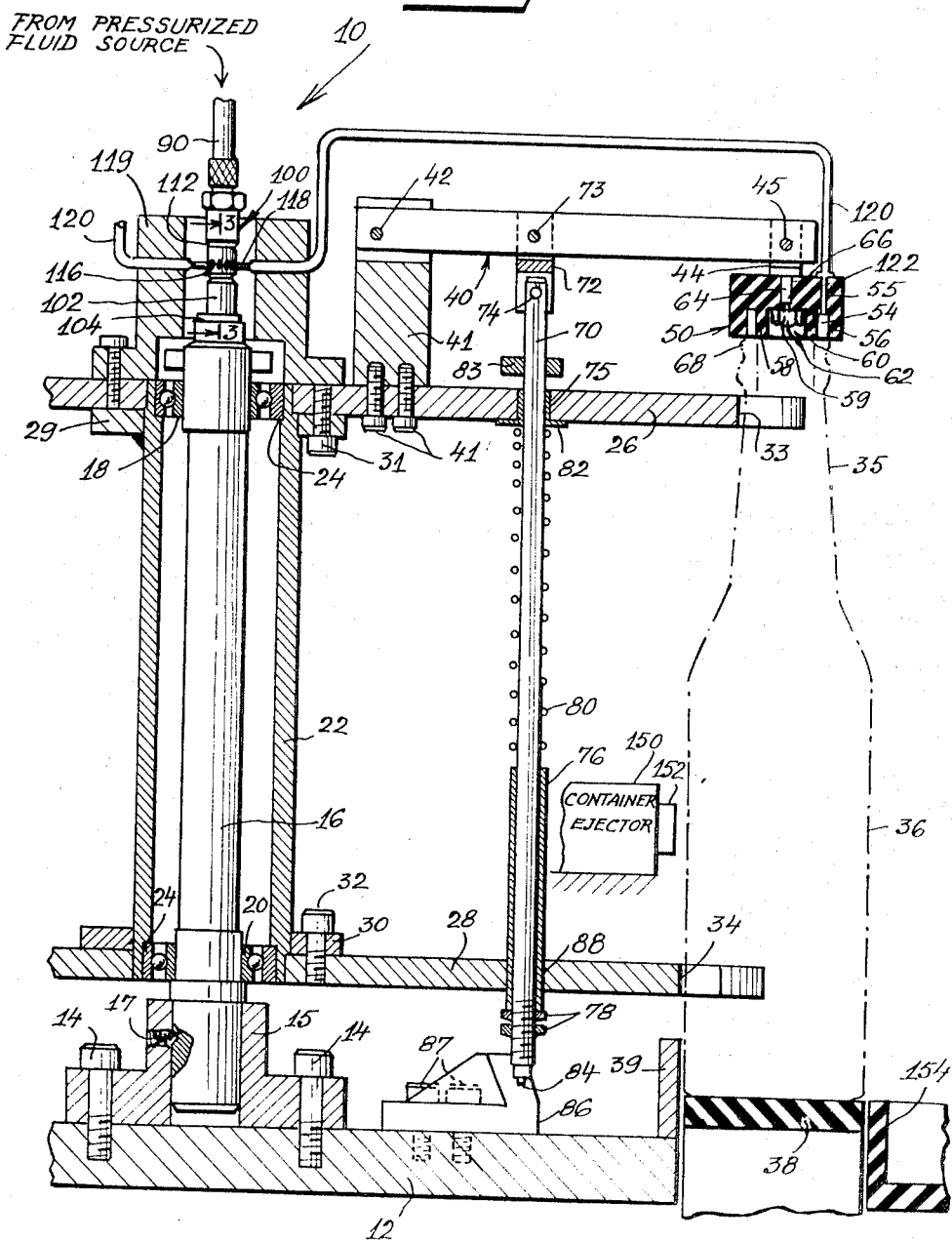
FIG. 2 is a vertical sectional view of the apparatus taken on line 2—2 of FIG. 1.
Figure 3:
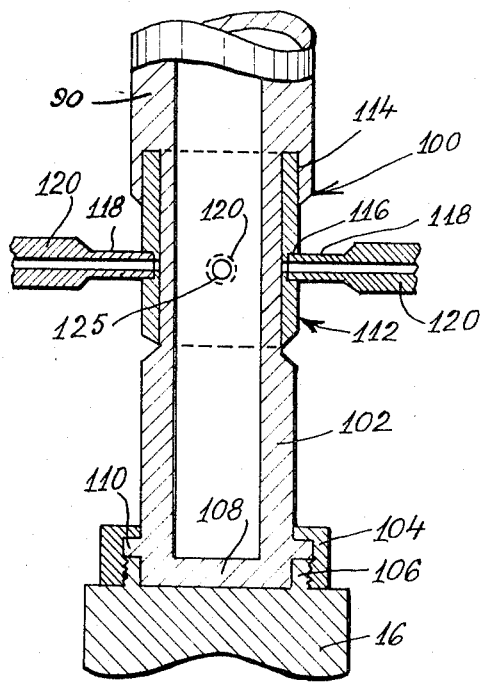
FIG. 3 is an enlarged fragmentary sectional view of the manifold taken on line 3—3 of FIG. 2.

A container ejection device 150 can be located at inspection position as shown in FIG. 2. This device 150 has a plunger 152 extending laterally of the container 36 at inspection position and arranged to push the container laterally to the right off of the conveyor 38 into a bin 154 if the container is defective as determined by the inspection apparatus.

Figure 4:
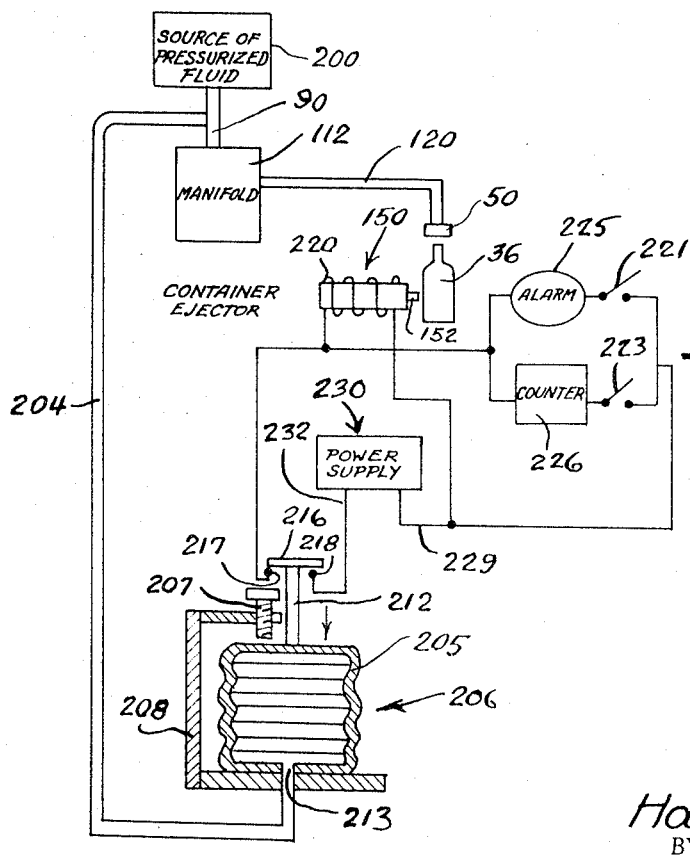
FIG. 4 is a diagram of fluid and electric circuits that may be employed in the apparatus to effect the ejection of a bottle that is defective.

FIG. 4 shows diagrammatically fluid and electric circuits that are used with this inspection apparatus. The source 200 of fluid pressure is applied to the manifold tube 112 via tube 90. Tube 120 conducts the fluid under pressure to sensor head 50 at the inspection position for container 36. A branch tube 204 is connected to a pressure-operated switch 206. This switch 206 has a closed bellows 205 with an adjustment stop screw 207 on one end of the bellows support bracket 208 to set the pressure at which the switch will operate. Tube 204 is connected at 213 to the bellows. A shaft 212 at end 214 of the bellows carries contact bar 216 normally open with respect to fixed contacts 217, 218. Contact 217 is connected to one end of solenoid coil 220 in bottle or article ejector 150 and to one end of alarm 225 and to one end of counter 226. The alarm and counter have separate switches 221, 223. The other ends of coil 220, alarm 225 and counter 226 are connected to terminal 229 of power supply 230. Terminal 232 is connected to contact 218. Movable plunger 152 of the bottle ejector 150 will move bottle 36 laterally when the ejector coil 220 is energized.

In operation, the bottles 36 on conveyor 38 move one at a time past apparatus 10. As each bottle approaches indentations 33 and 34 of star wheels 26, 28 at the inspection position, rod 70 moves up on cam 86 and then moves down under action of spring 80 to engage head 50 on the crown ring 68 of the bottle which has moved into inspection position. At that instant fluid pressure is applied through hole 125 in core 102 and through tube 120 and recess 54 to the crown ring. The crown ring closes the pressure chamber defined by the recess 54. If the crown ring is perfect, the pressure will be maintained in the pressure chamber and in tube 90. The fluid pressure in bellows 205 of the pressure-operated switch 206 will be maintained and switch contacts 216, 217, 218 will remain open. If the fluid pressure falls below a predetermined amount due to a defect at the crown ring causing fluid leakage thereover, bellows 205 will contract since it is only held expanded under pressure. Contact 216 then closes contacts 217 and 218 and the container ejector coil 220 is energized. Plunger 152 is thrust laterally to eject the container 36 from the belt and into bin 154. If switches 221 and 223 are closed, the alarm 225 will signal visually or audibly the rejection of the defective bottle or container and the counter will register the rejection.

This operation of the apparatus is continuous. Inspection takes place instantaneously. The moving bottles or containers rotate the wheels 26, 28 carrying the arms 40 and heads 50. If desired the star wheels can be driven by any suitable means, independently or by the conveyor but synchronized with the conveyor movement. The apparatus can be made to stop when a defective bottle has been found. The bottle or container ejection device 150 is only exemplary to show one way but other ways of ejecting defective bottle containers can be substituted. Other types of pressure responsive switches can be provided in place of the bellows type of switch 206 shown in FIG. 4. In any case, operation of the apparatus will be substantially equivalent that described. A similar arrangement can be used where vacuum is supplied.

It now be apparent that this invention makes it possible to inspect, bottle containers and other articles continuously, automatically and reliably. The apparatus is relatively simple and can be installed at existing bottle or container manufacturing or filling facilities at minimum expense.

What I claim is:

1. Apparatus for inspecting the tops of containers for flaws, chips, cracks and other defects, comprising a rotatable support; a plurality of resilient sensor heads carried by said support in circumferentially spaced relation thereabout, each head having a recess conforming to the top edge of a container to seal the same; a source of pressurized fluid; manifold means connecting said source of fluid to each of said heads, valve means for passing said fluid through said manifold means to only one of the heads located at an inspection position for a container; and means for applying each of said heads in turn to a container in a moving line of containers as each container passes the inspection position, the last-named means comprising pivotable arms carried by said support in radially extending circumferentially spaced positions, spring loaded rods pivotally connected to the arms respectively, and stationary cam means located at said inspection position, said rods riding said cam means in turn to elevate and then lower each arm and head in turn at said inspection position.

2. Apparatus as defined in claim 1, further comprising ejection means for ejecting a defective container, said ejection means being connected to said source of pressurized fluid and being responsive to loss in pressure to eject a defective container from said line.

3. Apparatus as defined in claim 2, further comprising a pair of vertically spaced, horizontal, peripherally serated wheels carried by said support, both said wheels having indentations arranged to engage each container in turn as it passes the inspection position.

4. Apparatus as defined by claim 2, wherein said ejection means comprises a fluid-operated electric switch having normally open contacts, said switch being responsive to a drop in fluid pressure at the switch to close said contacts and solenoid operated means disposed to move a container laterally out of said line of containers at the inspection position, said solenoid means being connected in circuit with said contacts and being energized when the contacts close upon a drop of fluid pressure at the switch caused by leakage of fluid at the one head located at the inspection position.

5. Apparatus as defined by claim 4, further comprising a pair of horizontal vertically spaced peripherally serrated wheels carried by said support, both said wheels having indentations arranged to engage each container in turn as it passes the inspection position.

6. Apparatus as defined in claim 1, wherein said rotatable support comprises a pair of peripherally serrated wheels, said wheels having indentations arranged to engage each container in turn as it passes said inspection position, said pivotable arms being carried by one of said wheels.

7. Apparatus as defined in claim 1 for inspecting open tops of containers, wherein the recess in each sensor head is so shaped that the sensor head grips both internally and externally the open top of a container being inspected while said fluid is applied to the sensor head for detecting a defect in the shape of the open top of the container gripped by the sensor head; and means responsive to leakage of said fluid over the top of the container being inspected to indicate the defective condition of the container being inspected.

8. Apparatus as defined by claim 1, further comprising a pair of peripherally serrated wheels carried by said support, said wheels having indentations arranged to engage each container in turn as it passes said inspection position.

9. Apparatus as defined in claim 1, wherein the valve means comprises a valve core connected to said source of pressurized fluid, said core having a single hole in one side thereof oriented toward said inspection position, said manifold means comprising a tube rotatably disposed on said core and a plurality of tubes connected between the manifold tube and the sensor heads respectively, whereby pressurized fluid passes through said hole to said one head via one of the tubes when the one head is located at the inspection position.

10. Apparatus as defined by claim 9, further comprising ejection means for ejecting a defective container, said ejection means being connected to said source of pressurized fluid and responsive to loss in pressure to eject the defective container.